United States Patent [19]

Schuman

[11] 4,013,443
[45] Mar. 22, 1977

[54] METHOD OF PREPARING LIQUID FERTILIZER

[76] Inventor: Edwin Kaine Schuman, 100 W. 14th, Rolla, Mo. 65401

[22] Filed: Feb. 18, 1976

[21] Appl. No.: 659,148

[52] U.S. Cl. .................................. 71/31; 71/63; 71/64 C
[51] Int. Cl.$^2$ .................................. C05D 1/02
[58] Field of Search ............... 71/1, 63, 64 DA, 59, 71/64 C, 31; 423/551, 554

[56] References Cited

UNITED STATES PATENTS

| | | | |
|---|---|---|---|
| 3,179,509 | 4/1965 | Schuman | 71/1 |
| 3,582,311 | 6/1971 | Browder et al. | 71/29 X |

Primary Examiner—Thomas G. Wyse
Assistant Examiner—Ferris H. Lander

[57] ABSTRACT

Langbeinite($2MgSO_4:K_2SO_4$), $Na_2HPO_4$, and $NH_4NO_3$ are chemically reacted in that critical order to produce a soluble suspension fertilizer of 11N, 8 $P_2O_5$, 3 $K_2O$ + 1.3 MgO containing 14 inorganic nutrients and two enzymes (after KCl has been added). The reactions show the increase in the number and structural changes of the nutrients, its resemblance to bird guano (in content), the ionization of magnesium ammonium phosphate, the inorganic and organic enzymes and the catalytic activity of magnesium in solution, a buffered solution capable of changing from an acid to a base with dilution by water, the evolution of free ammonia at ordinary temperatures, and the enzymes $HPO_4^{--}$ and $H_2PO_4^-$ which are the phosphorus ions absorbed by the roots of plants.

There are two separate and distinct kinds of Mg sulfate in this specification. The inventor knows of no other process, use or composition based on this difference.

The use of langbeinite is shown to be an improvement in U.S. Pat. No. 3,179,509 resulting from the discovery that $MgSO_4$ in Langbeinite($2MgSO_4:K_2SO_4$) has a better chemical behavior than the $MgSO_4$ in Epsom Salts ($MgSO_4:7H_2O$). The former acts as a desiccating or drying agent to improve the process of U.S. Pat. No. 3,179,509 and to make possible the dry products of this application.

12 Claims, No Drawings

METHOD OF PREPARING LIQUID FERTILIZER

This invention relates to improvements in a 11–8–3 + 0.8% magnesium fertilizer which has been on the market for over 10 years. It involves the materials used, the final composition, and the method of preparing the fertilizer described in U.S. Pat. No. 3,179,509 issued to Edwin K. Schuman, Apr. 20, 1965.

The use of fertilizers originated with the discovery by Leibig that plant food in the soil is lost through the harvest and must be returned. Later came the law of the minimum stating that increases in yield depend upon the minimum of the nutrients, which led to enriching the soil with the so-called "complete" fertilizer composed of N-P-K. Later calcium was considered necessary and added to dolomitic limestone. Magnesium received very little attention as a plant food until the food storage in Germany, France, etc. in the latter part of the 19th century. This condition had resulted from the replacement of cainite (a source of potash containing magnesium as an impurity) with sylvite a source of pure potash. Now it is known that all plant tissue contains about 0.3% magnesium. If our nation is to survive, then the magnesium in the crops which are removed from the fields must be regularly returned.

If calculations are restricted to the 1975 national corn wheat and soybean reports, there was a magnesium removal from our soils of 266 million lbs. by soybeans, 1,300 million lbs. by corn, and 472.5 million lbs. by wheat, or a total of 2,038,000,000 lbs., to be returned by Epsom Salts or Langbeinite, etc. Even more staggering is the wattage of electrical energy used in its recovery by electrolysis.

There is a critical need for an ample supply of magnesium for our nation's food supply. At present the chief source is sea water, where 1 cu. mile contains 60,000 cu. ft. of magnesium. It is recovered by precipitation as $Mg(OH)_2$, then converted to $MgCl_2$, from which the metal is recovered by electrolysis. The metallic salt $MgSO_4:7H_2O$ is used in medicine; when used in agriculture it is expensive.

There are many sources of magnesium where it occurs as a compound sulfate with potassium. Whether it is used for the metallic magnesium or as a soil nutrient depends upon the economy of the region. There is a large deposit of polyhalite ($K_2SO_4$, $MgSO_4$, $2CaSO_4:2H_2O$) at Carlsbad, New Mex. which yields Langbeinite ($K_2SO_4$, $2MgSO_4$) after considerable beneficiation. This mineral, analysing at 10.85% Magnesium and 22.0% $K_2O$, with Cl less than 2.50%, is now quoted at $72.00/ton f.o.b. Missouri outlets. It is being sold as a soil conditioner, and not in terms of its nutrient units. If it were priced in units, the magnesium has a value of $325.50 per ton at 15 /lb., and the 22 units of $K_2O$ is $33.00, at $1.50 per unit, a total of $358/ton, as used in the process described in U.S. Pat. No. 3,179,509.

In particular this invention relates to the use of Langbeinite ($K_2SO_4$, $2MgSO_4$) in U.S. Pat. No. 3,179,509 in the place of Epsom Salts, and which supplies a portion of the $K_2O$ needed in the processes mentioned, to produce dry or liquid fertilizers.

It is not obvious that the substitution of one magnesium sulfate ($MgSO_4:7H_2O$) by another ($K_2SO_4:2MgSO_4$) containing potash, into a chemical reaction would not change the chemical behavior of the system, or its use in argiculture. However, there are two separate and distinct kinds of magnesium sulfate involved in this specification. The inventor knows of no other process or use now being capitalized on this difference.

The magnesium sulfate in U.S. Pat. No. 3,179,509 is pharmaceutical Epsom Salts ($MgSO_4:7H_2O$), safe for internal use. It consists of white rhombic crystals where each magnesium molecule is chemically bonded to 7 molecules of $H_2O$, 51% $H_2O$, 49% $MgSO_4$.

The magnesium sulfate used in the present invention is that found in Langbeinite ($K_2SO_4:2MgSO_4$), a mineral mined in Carlsbad, New Mex. It is grey or blue tetrahedral crystals in a solid solution. The negatively charged magnesium ions were previously attracted to the polar ends of water molecules, while the positive ends were attracted to the oxygen ends of the water dipoles. These have been displaced by the similar ions of potassium sulfate ($K_2SO_4$) to form a solid solution. It contains no water. It is known by chemists that it is possible for ions to be surrounded by, or coordinated with, solvent molecules other than water.

This is important because the affinity for $H_2O$ is so great that when the temperature of the solid solution is raised sufficiently the chemical bonds holding the $K_2SO_4$ are readily broken, leaving the $MgSO_4$ anhydrous to act as a drying agent or desicant.

It is an object of this invention to use these chemical properties peculiar to Langbeinite ($K_2SO_4:2MgSO_4$) to produce the liquid fertilizer of U.S. Pat. No. 3,179,509 and many types of dry fertilizers containing magnesium in more than trace amounts. They are not now available on the market because they are not economically feasible when Epsom salts ($MgSO_4:7H_2O$) is used in the manufacture.

Dry fertilizers are economically feasible from Langbeinite because all products crystallize readily when the water in the original solution is severely reduced. However, when using Epsom Salts ($MgSO_4:7H_2O$) this water can not be similarly reduced. The products resist drying, remain unstable and deliquescent. The problem is caused by the 51% water of crystallization in Epsom Salts itself.

This invention enables the production of dry fertilizers containing N-P-K plus magnesium in greater amounts than traces, which are more easily used; i.e., granules to be spread around or mixed in, pills to be inserted in pots, and cakes or spikes to be inserted around the roots of vegetables, trees, and shrubs. Each furnishes some of the magnesium needed for plant growth, and contain the components within themselves to yield $HPO_4^{--}$ and $H_2PO_4^-$ and act immediately upon solution.

Thus, there will be both liquid and dry fertilizers available which contain magnesium in the presence of phosphorus, with a pH of approximately 5.9, and when diluted or dissolved for use, a pH of approximately 7.4. Both evolve anhydrous ammonia at ambient temperature. Both are quasi chemical systems (not mechanical mixtures) forming $HPO_4^{--}$ and $H_2PO_4^-$ which were proved by scientists at Arizona and USDA to be the final chemical form in which phosphorus is absorbed by the roots of plants. These compounds can not be bought on the market and mixed in. They are obtainable only by the reaction of magnesium and phosphorus during the making of a fertilizer or later on by the chemistry of the micro-organisma in the soil surrounding the roots. With annual crops, there is not time to wait on the soil bacteria, especially during the usual 6 weeks of grand growth. This explains the effective differences between conventional fertilizers and those that are immediately available to the plant's metabolic system.

Because the reaction between $MgSO_4$ and $Na_2HPO_4$ is exothermic, and the reaction between $MgHPO_4$ and $NH_4NO_3$ is endothermic, the processes as described herein will proceed without external heat. The first will take about 12 hours, the second a few more. It should not be attempted at temperatures below 70° F.

Examples of formulations of this invention are set forth below. The proportions of the constituents can be varied within operable limits without departing from the inventive concepts hereof.

An example of preparing one gallon of liquid fertilizer where Langbeinite is substituted for Epsom Salts is as follows:

18 oz. av. of Langbeinite are added to a vessel containing 80 fl. oz. of water at room temperature and which is operably associated with an agitator.

The solution is raised slowly to a vigorous boil with frequent agitation for 10 to 15 minutes. The volume would then be approximately 64 fl. oz., and the insolubles about 3.4 oz. av.

The vessel is removed from the burner and the insolubles are removed by decantation. Then 32 oz. av. of sodium dibasic phosphate ($Na_2HPO_4$) anhydrous, food grade are introduced to precipitate magnesium hydrogen phosphate ($MgHPO_4$) which occurs almost instantly.

This reaction is halted by the addition of 7 oz. av. of muriate of potash (KCl) 60% $K_2O$ which are stirred-in until properly dissolved.

0.47 oz. av. of borax, technical grade ($Na_2B_4O_7$:10-$H_2O$) and 0.63 oz. av. of Jaguar HP-8, made by Stein Hall Co. Inc. 605 3rd Ave., N.Y., N.Y., 10016, or its equivalent are combined with 74 oz. av. of ammonium nitrate ($NH_4NO_3$) 34% N, which are added in bulk. The mixture is then stirred thoroughly until it is homogeneous.

Micronutrients such as chelates or sulfates of Mn, Fe, Cu, and Zn, as well as Molybdic Acid can be introduced at this time. The fertilizer is ready for bottling and transportation after it settles for about 30 minutes and the volume is adjusted.

The one gallon of liquid fertilizer as prepared above has a grade of 13-8-4 + 0.8 Mg; it costs about $0.72. With a 40 lb. nitrogen demand per acre for pastures it would require 25.64 gallons. The magnesium content can be raised to combat grass tetany. The chlorine content is 1.72%.

The grade of a similar product made with Epsom Salts would be 11-8-3+0.8 Mg. because of the solubilities of the components. The cost would be about $0.83 per gal. or 12% more than the present invention. At 40 lbs. of nitrogen per acre it would require 30.86 gals.; a cost increase of 40%. The manufacturing cost may be greater because Epsom Salts does not react as rapidly as Langbeinite. The magnesium content could not be raised appreciably. The chlorine content would be 2.3%.

Tests show that the use of Langbeinite ($K_2SO_4$:2$MgSO_4$) for the magnesium carrier in the present fertilizers requires different processes of manufacture than that in U.S. Pat. No. 3,179,509. The order of mixing is the same. The difference is brought about by their respective solubilities. Epsom Salts ($MgSO_4$:7$H_2O$) contains 51% of water of crystallization. Its solubility is 73.8 pp/100 at 100° C. Langbeinite carries no water of crystallization; each pound contains 6.5 oz. av. of $K_2SO_4$ at 51% $K_2O$; its solubility is but 24 pp/100 100° C. The highly soluble magnesium salts envelopes the lesser soluble potassium salt, and must be removed to expose the potassium sulfate to the water. This is done by starting with water at about 70° F, and raising it to about 200° F while agitating it frequently to prevent coalescence. A vigorous boil is maintained for 10 to 15 minutes. It can be reacted at this temperature or allowed to cool.

The user of this fertilizer dilutes it in the ratio of 1 fl. oz. of fertilizer to each 1 gal. of water, which is suitable for direct application to the soil surrounding the plants. It has a pH of about 7.4. Best results are obtained by a thorough soaking. Applications should be repeated every 10 days to two weeks during the growth season. The fertilizer is also effective when applied at greater dilutions such as 1 teaspoon of fertilizer to one quart of water, and at longer time intervals than two weeks.

In the production of dry powder or granular fertilizers the ultimate use becomes important. A fertilizer to be spread over a field or around the roots of plants need not be so readily soluble. It is called slow release as opposed to one to be dissolved in water before using on house plants and gardens, and called instant liquid fertilizer.

The affinity of Langbeinite for water permits great or drastic variations in the amounts to be used. The water content in dry fertilizers affects the time of drying or setting; it is hyper-critical.

The preparation of a slow release dry powdered fertilizer using Langbeinite as the magnesium carrier is prepared in the following manner; 9 oz. av. of Langbeinite are added to a vessel containing 14 fl. oz. water at room temperature, and which is operably associated with an agitator.

The temperature of the solution is raised to a slow boil which is maintained for 8 to 10 minutes. The loss in volume from evaporation should be about ½ fl. oz.: the insolubles, about 4.5 oz. av., are not removed.

Next 16 oz. av. of anhydrous sodium dibasic phosphate ($Na_2HPO_4$) food grade is introduced to precipitate the released magnesium sulfate to very quickly form magnesium hydrogen phosphate ($MgHPO_4$). A mechanical mixer is required for this and the following operations.

The above reaction is halted by mixing-in 8 oz. av. of muriate of potash (KCl), 60% $K_2O$ until the mixture is homogeneous.

Next 0.47 oz. av. of borax, technical grade ($Na_2B_4O_7$:10$H_2O$) and 1 oz. av. of Jaguar HP-8, made by Stein Hall Co. Inc. 605 3rd Ave., N.Y., 10016, or its equivalent are mixed with 32 oz. av. of ammonium nitrate ($NH_4NO_3$) 34% nitrogen are added in bulk and the mixture stirred vigorously until it assumes liquidity and becomes homogeneous.

The fertilizer is then poured in ½ to 2 inch layers to set and harden, or poured into molds to form fertilizer cakes, tree spikes, or pills which are used by inserting them into the soil. It can also be left to harden sufficiently to be ground into a fine powder; it has but a slight tendency to cake or deliquesce in ordinary surroundings. The time of hardening is from a few hours to a few days.

The fertilizer prepared as above is a slow release fertilizer. Only about one half of the available magnesium in the Langbeinite has been released to react chemically with the other components. The remaining portion will ultimately be released by soil moisture or rains so it can react later, thereby providing prolonged nutrient feeding. This fertilizer has a grade of 14–10–9 + 1.2 Mg. and contains 17.5% of water, 82.5% of solids.

This process is unique. It is not economically feasable (or possible) using ($MgSO_4:7H_2O$) or its equivalent because the mixture becomes unworkable when the water content has been reduced to 4½ parts to dissolve 9½ parts of Epsom Salts, 8 parts of muriate of potash, 16 parts of sodium dibasic phosphate and 32 parts of ammonium nitrate.

Micronutrients of Zn, Fe, Mn, Cu, as well as molybdic acid can be added after the admixture of the ammonium nitrate when Langbeinite is used. Some water adjustment might have to be made.

To make an instant dry fertilizer which is nearly 100% water soluble and can be molded into quick dissolving, pills, cakes, or spikes; the following process is used.

9 oz. av. of Langbeinite are added to 35 fl. oz. of water at room temperature in a vessel mechanically agitated.

The solution is raised slowly to a boil and kept there until the volume has dropped to 16 fl. oz., usually requiring 10 to 15 minutes.

The solution is removed from the burner and the insolubles removed by decantation.

16 oz. av. of sodium dibasic phosphate, food grade, anhydrous ($Na_2HPO_4$) are added and the mixture stirred with a mechanical mixer until the components have reacted to form a white, pasty mass of magnesium hydrogen phosphate ($MgHPO_4$).

This reaction is halted by the mixing-in of 6 oz. av. of muriate of potash (KCl) containing 60% $K_2O$ which is well mixed.

One oz. av. of Jaguar HP-8, made by Stein Hall Co. Inc. 605 3rd Ave., N.Y., N.Y., 10016, or its equivalent, and 0.47 oz. av. of sodium borate ($Na_2B_4O_7:10H_2O$) are mixed with 25 oz. av. of ammonium nitrate ($NH_4NO_3$) 34% N., which is added in bulk to the mixture which is stirred until it becomes fluid and homogeneous. The fertilizer is then poured in ½ to 2 inch layers to set and harden, or poured into molds.

What is claimed as new and desired to be secured by Letters Patent is:

1. A method of preparing a liquid fertilizer comprising the steps of:
    a. dissolving a quantity of ($K_2SO_4:2MgSO_4$) in water at room temperature in a vessel connected to an agitator;
    b. raising the solution slowly to a vigorous boil with frequent agitation for 10 to 15 minutes which reduces the volume by approximately 20% and dissolves approximately 80% of the ($K_2SO_4:2MgSO_4$);
    c. removing the insolubles by decantation;
    d. adding a quantity of $Na_2HPO_4$ to the admixture for reaction with the $MgSO_4$, the quantity of $Na_2HPO_4$ being in excess of the stoichiometric amount thereof reactable with the constituents of the admixture;
    e. dissolving sufficient quantity of a dispersing agent selected from the group consisting of NaCl and KCl to the admixture to prevent agglomeration of the particles therein;
    f. adding a quantity of $NH_4NO_3$ to the admixture for reaction with the constituents thereof, the quantity of said $NH_4NO_3$ added to the admixture being in excess of the stoichiometric amount thereof reactable with the constituents of the admixture, the quantities of said $MgSO_4$, $Na_2HPO_4$, and $NH_4NO_3$ added to the water being sufficient to produce an acidic, buffered saturated solution and suspension and
    g. recovering the saturated solution and suspension after equilibrium conditions have been established and consisting substantially of $Na_2SO_4$, $MgHPO_4$, $MgNH_4PO_4$, $Na_2HPO_4$, $NaH_2PO_4$, $NH_4NO_3$, $NaNH_4HPO_4$, $(NH_4)_2SO_4$, $NaNO_3$, $HNO_3$, $NH_4OH$, the radicals $[HPO_4]^{--}$, $[H_2PO_4]^-$, ionic Na, free $NH_3$, $H_2O$ and substantial amounts of $K_2SO_4$.

2. A method as set forth in claim 1 wherein as approximate parts by weight for each 80 parts of water, 18 parts $K_2SO_4:2MgSO_4$, 32 parts $Na_2HPO_4$, 7 parts KCl, 0.47 parts $Na_2B_4O_7:10H_2O$, 0.63 parts guar gum (hydroxyalkyl or hydroxypropyl guar gum) and 74 parts $NH_4NO_3$ are added to said water.

3. A method as set forth in claim 2 where is included the step of adding the micronutrients of Mn, Fe, Cu, Zn as chelates, sulfates or other chemical compounds, or Mo, as a salt or an acid.

4. A liquid fertilizer comprising the reaction products obtained by admixing calculated as approximate parts by weight of 50 parts of water, 14.5 parts ($K_2SO_4 2MgSO_4$), 32 parts $Na_2HPO_4$, 7 parts KCl, (60%$K_2O$), 0.47 parts $Na_2B_4O_7:10H_2O$, 74 parts $NH_4NO_3$ and 0.63 parts of guar gum (hydroxyalkyl or hydroxypropyl guar gum).

5. A powdered or granular fertilizer which after having been dissolved in proportions of 0.67 oz. av. (2Tbs) to 1 gallon of water produces a liquid fertilizer having the chemical, fertility and yield characteristics and uses as that in claim 4.

6. A powdered or granular fertilizer which when added to water in the proportions of 0.67 oz. av. (2Tbs) to one gallon, approximately one half will immediately behave as a reactive fertilizer with the remainder not performing as a reacted fertilizer until it has had sufficient time and soil moisture to comply with the chemistry of claim 1.

7. A solid fertilizer as in claim 5 where the micronutrients Mn, Fe, Cu, Zn are added as chelates or sulfates and molybdenum as an acid or salt.

8. A solid fertilizer as in claim 6 where the micronutrients Mn, Fe, Cu, Zn are added as chelates or sulfates and molybdenum as an acid or salt.

9. A process as set forth in claim 1 wherein as approximate parts by weight for each 7.5 parts of water, 9 parts of $K_2SO_4:2MgSO_4$, 16 parts $Na_2HPO_4$, 8 parts KCl (60% $K_2O$), 32 parts $NH_4NO_3$, 0.23 parts $Na_2B_4O_7:10H_2O$ and 1 part of guar gum (hydroxyalkyl or hydroxypropyl guar gum) are added to the water to form a solid fertilizer where about one-half of the components have reacted into a chemical compound, the other portion remaining as a mechanical mixture.

10. A process as set forth in claim 9 where the micronutrients Mn, Fe, Cu, Zn, have been added as chelates or sulfates and molybdenum as an acid or a salt.

11. A process as set forth in claim 1 wherein as approximate parts by weight for each 29 parts of water, 9 parts of $K_2SO_4:2MgSO_4$, 16 parts $Na_2HPO_4$, 6 parts KCl (60 $K_2O$), 1 part guar gum (hydroxyalkyl or hydroxypropyl guar gum), 0.23 parts of $Na_2B_4O_7:10H_2O$ and 25 parts $NH_4NO_3$ are added to the water to create a chemical system that will form a solid fertilizer.

12. A process as set forth in claim 11 where the micronutrients Mn, Fe, Cu, Zn, have been added as chelates or sulfates and molybdenum as an acid or as a salt.

* * * * *